United States Patent [19]

Eunson

[11] Patent Number: 4,858,747
[45] Date of Patent: Aug. 22, 1989

[54] DRIVE MOTOR CONTROLLING DEVICE FOR A MATERIAL TRANSPORTING CONVEYOR

[75] Inventor: Charles S. Eunson, Winnipeg, Canada

[73] Assignee: Strong Equipment Corporation, Downsview, Canada

[21] Appl. No.: 168,364

[22] Filed: Mar. 15, 1988

[51] Int. Cl.[4] .................... B65G 43/06; F16D 7/00
[52] U.S. Cl. ...................... 198/718; 474/102; 198/719; 198/810; 198/856; 192/133; 74/609
[58] Field of Search ............ 198/718, 719, 810, 856; 74/609; 192/133; 474/102, 104, 105, 140, 144

[56] References Cited

U.S. PATENT DOCUMENTS

| | | | |
|---|---|---|---|
| 1,163,125 | 6/1927 | Happel . | |
| 2,230,745 | 2/1941 | Eiselstein | 198/856 |
| 2,255,880 | 6/1951 | Freuchtel | 198/232 |
| 3,066,789 | 12/1962 | Schmeck | 198/208 |
| 3,200,935 | 8/1965 | Whitfield | 198/171 |
| 3,279,538 | 6/1957 | Schenk . | |
| 3,419,127 | 12/1968 | Yost | 198/16 |
| 3,605,295 | 9/1971 | Walewski | 198/719 |
| 3,680,685 | 8/1972 | Halton | 198/856 |
| 3,905,473 | 9/1975 | Jones et al. | 198/718 |
| 3,952,864 | 4/1976 | Schlagel | 198/232 |
| 4,071,136 | 1/1978 | Jones | 198/718 |
| 4,195,725 | 4/1980 | Jones | 198/718 |
| 4,527,686 | 7/1985 | Satoh | 474/102 |
| 4,657,131 | 4/1987 | Brychta et al. | 198/856 |

FOREIGN PATENT DOCUMENTS

| | | | |
|---|---|---|---|
| 1030476 | 5/1978 | Canada | 198/102 |
| 0149913 | 11/1981 | Japan | 198/810 |
| 0007614 | 1/1984 | Japan | 198/718 |
| 0810566 | 3/1981 | U.S.S.R. | 198/856 |

*Primary Examiner*—Andres Kashnikow
*Assistant Examiner*—Christopher G. Trainor
*Attorney, Agent, or Firm*—Rogers, Bereskin & Parr

[57] ABSTRACT

A conveyor is shown having an endless material transporting member running between an idler sprocket at one end and a drive sprocket at the other, both supported in a frame of the conveyor. A drive motor is used to drive the drive sprocket, and hence the conveyor. A controlling device for the motor is provided having a pivotally mounted slack sensing lever having a first rest position spaced apart beneath an upper flight of the endless material transporting member. A counterweight, resting on a stop urges the lever in position. The lever is fixed to a pivot pin, which has a trip lever attached. Upon slack in the chain deflecting the slack sensing lever, the pivot pin rotates moving the trip lever which in turn activates a microswitch controlling the motor. Upon sufficient deflection, the motor will be de-activated. In another aspect of the invention, a foreign object sensing flap is provided, which through linking elements, can cause the motor to be similarly de-activated, upon the material being transported, being carried past the exit of the conveyor.

9 Claims, 2 Drawing Sheets

DRIVE MOTOR CONTROLLING DEVICE FOR A MATERIAL TRANSPORTING CONVEYOR

FIELD OF THE INVENTION

This invention relates to a controlling device for a drive motor used on a material transporting conveyor, and in particular to a controlling device of the type which will stop the motor in particular circumstances.

BACKGROUND OF THE INVENTION

Material transporting conveyors are known, and have been used extensively to provide a way of efficiently transporting granular material from one location to another. Such conveyors are particularly well suited for transporting material such as grain.

Generally, such conveyors have a drive motor, which causes a material transporting member to move the material along. Typically, the material transporting member is in the form of an endless loop, running between a drive sprocket at one end, driven by the drive motor and an idler sprocket at the other end. The material transporting member may have scraper blades, to push the material along. Material is introduced near or at one end, and exits from the conveyor near or at the other end.

With such conveyors, problems can arise because there inevitably will be occasions where the material transporting member becomes jammed, for example because of a misaligned scraper blade, or, the member may break, due to wear, fatigue or the like. In the case of a covered or enclosed conveyor, if the member breaks and the drive motor continues, it will cause the member to accumulate in a heap on the upstream side of drive sprocket. The member may get tangled around the drive sprocket and even further broken. Subsequently, it can be very tedious and difficult to re-thread the member through an enclosed conveyor, which is still half full of material to be transported. In the case of a jam, it is desirable to stop the motor to prevent the member from breaking. For all these reasons, it is desirable to be able to sense if the member has broken or is jammed and, upon such conditions, to be able to stop the drive motor to prevent compounding the problem.

BRIEF SUMMARY OF THE INVENTION

In accordance with a broad aspect of the invention, there is provided a conveyor having an endless material transporting member running between an idler sprocket at one end and a drive sprocket at the other end, a support frame for supporting said sprockets and a drive motor for driving said drive sprocket, the drive motor controlling device comprising:

a pivotally mounted slack sensing lever having a first rest position spaced apart beneath an upper flight of said endless material transporting member, a means for urging said slack sensing lever into said first rest position, a means for sensing displacement of said slack sensing lever from said first rest position, and a control switch actuated by said sensing means for stopping said motor upon a predetermined amount of displacement of said slack sensing lever from said first rest position.

One construction of a drive motor controlling device in accordance with the invention will now be described, by way of example, reference being made to the drawings.

PREFERRED EMBODIMENT OF THE INVENTION

Figure 1:
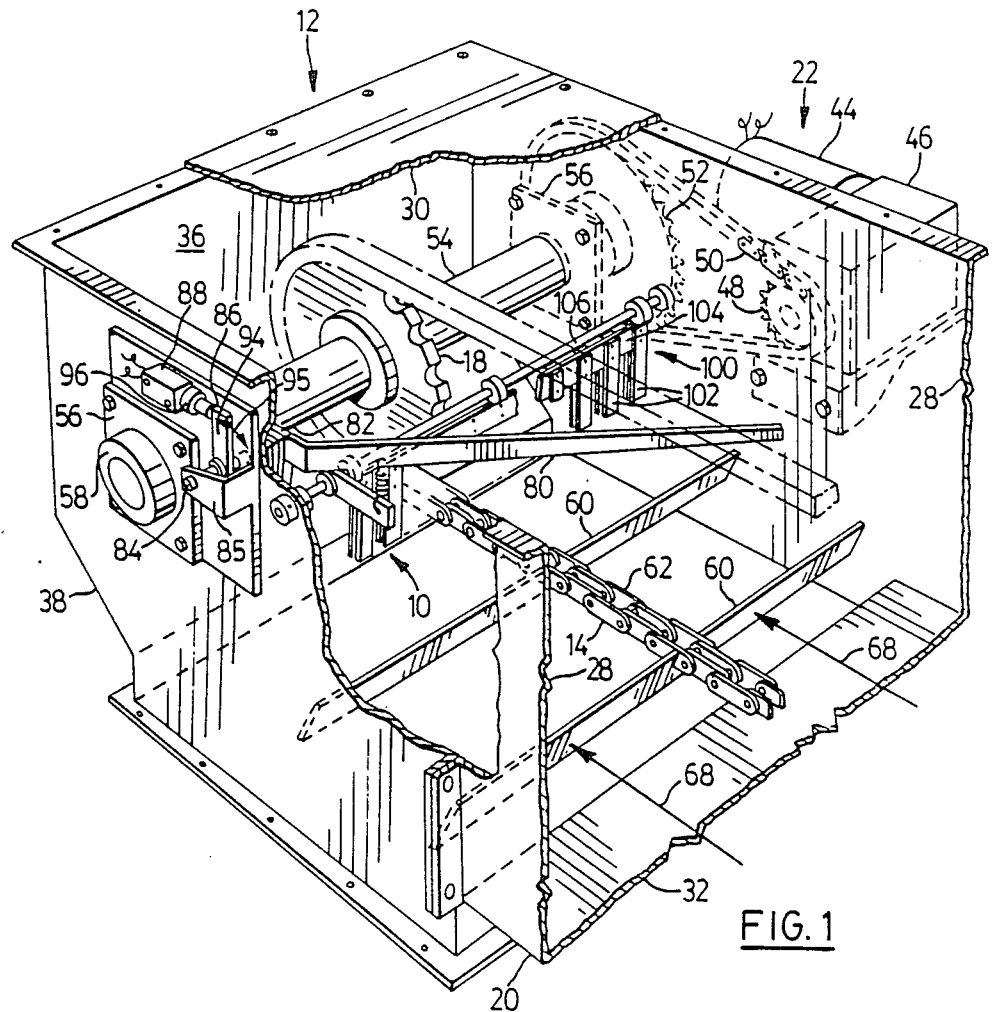
FIG. 1 is an isometric view in part section of a drive motor controlling device installed on a conveyor according tto the present invention.

Referring to FIG. 1, there is shown a drive motor controlling device indicated generally at 10. FIG. 1 illustrates the general setting for the device 10, which is a material transporting conveyor shown in part section and indicated generally at 12. The conveyor 12 includes an endless material transporting member 14 which runs between an idler sprocket 16 (shown in FIG. 3) and a drive sprocket 18. The drive sprocket 18 is at one end of the conveyor 12, while the idler sprocket 16 is at the other end.

Also shown in FIG. 1 is a support frame 20, which supports the sprockets 16, 18 and a drive motor 22 for driving the drive sprocket 18. The support frame 20 has an inlet chute 24 and an outlet chute 26. The support frame is generally rectangular having upstanding sides 28 and a top 30 and bottom 32. In addition, an end wall 34 adjacent the idler sprocket is provided and an end wall 36 adjacent the drive sprocket is also provided. The end wall 36 may have a sloping shoulder 38 totwards the outlet chute 26. The support frame 20 supports the idler sprocket 16 and drive sprocket 18 in place, together with a number of other components, such as rollers 40 as shown in FIG. 3.

Figure 3:
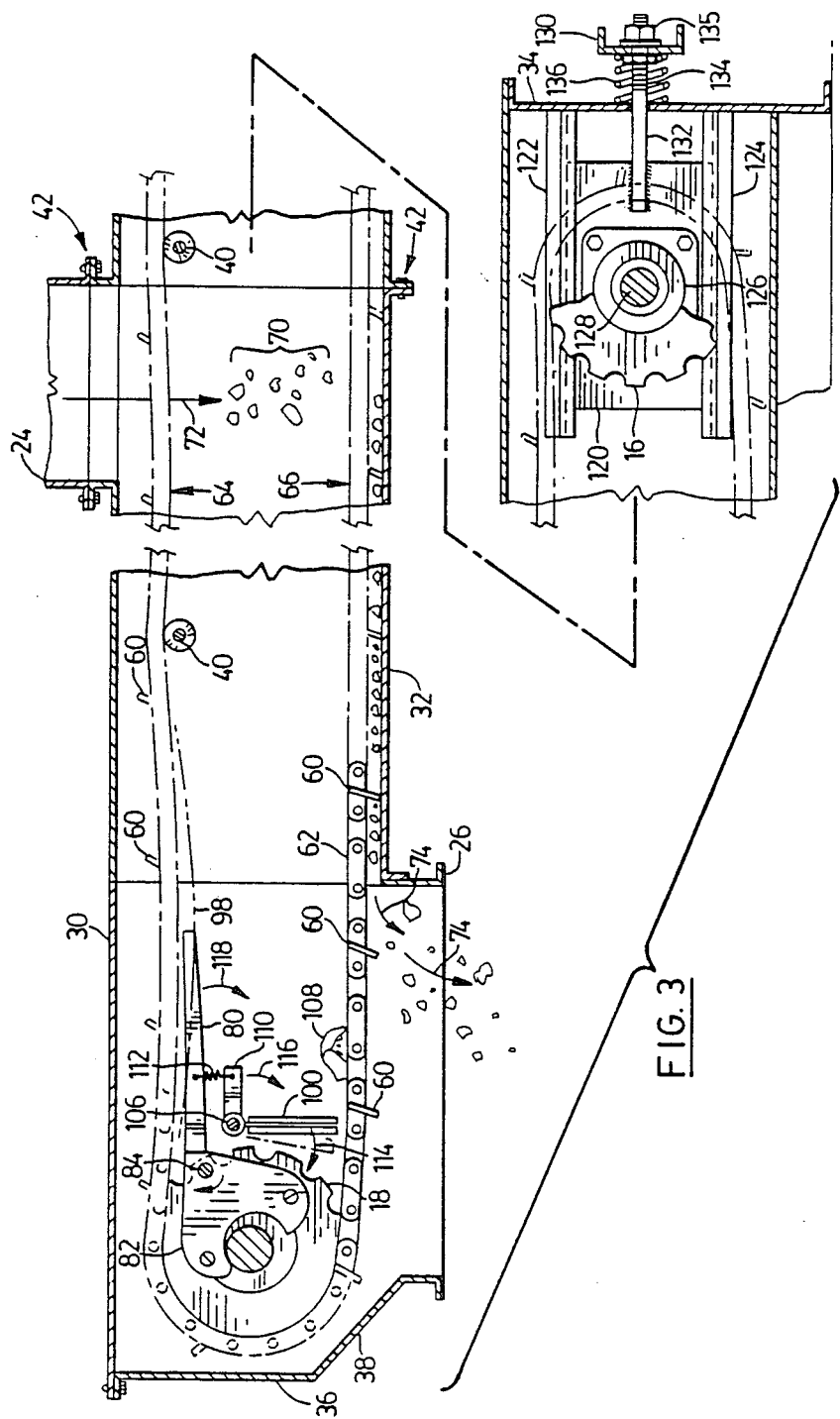
FIG. 3 is a side view in broken section of a conveyor having a drive motor controlling device according to the present invention.

The support frame may be formed from prefabricated pieces of sheet metal which are attached for example by means of flanges and bolts as shown at 42 in FIG. 3. While the conveyor is shown as a closed top conveyor, it may also be open topped.

The drive motor 22 is attached to the outside of the support frame 20 as shown in FIG. 1. The drive motor 22 consists of a motor in a motor housing 44 and a gear box 46. Protruding from the gear box 46 is a small toothed wheel 48 around which runs a chain 50. The chain also runs around a large toothed wheel 52. Drive is transmitted from the drive motor 22 through the gear box 46 to the small toothed wheel 48. The chain 50 then transmits the drive to large toothed wheel 52.

The drive sprocket 18 is rotationally secured to an axle 54. The axle 54 is supported in the support frame 20 by means of bearing plates 56 and bearings 58. At one end of the axle 54 is attached the large toothed wheel 52. Thus drive transmitted to the large toothed wheel 52 is transmitted in turn to axle 54 and to drive sprocket 18.

As best shown inn FIG. 3, the endless material transporting member 14 is comprised of a number of scraper blades 60 attached to a chain 62. As shown in FIG. 1, the drive sprocket 18 is in the form of a toothed wheel which meshes with the chain 62. The endless material transporting member 14 has an upper flight 64 and a lower flight 66. Shown in FIG. 1, by arrows 68, is the direction of movement of the lower flight 66. As can be seen in FIG. 3 material 70, is dropped into the conveyor 12 through inlet chute 24 in the direction of arrow 72. It lands on the bottom 32 of the support frame 20, where it is scraped along by scraper blades 60 towards outlet chute 26. Upon reaching outlet chute 26, the material 70 falls in the direction of arrows 74 and out of the conveyor 12. In this manner, the material 70 is transported from one end of the conveyor 12 to the other.

Associated with the material transporting member 14, is the drive motor controlling device 10. The device 10 is composed of a number of elements including a pivotally mounted slack sensing lever 80, a counterweight 82, a pivot pin 84, to which is secured a control switch actuator 86, and a control switch 88.

Figure 2:
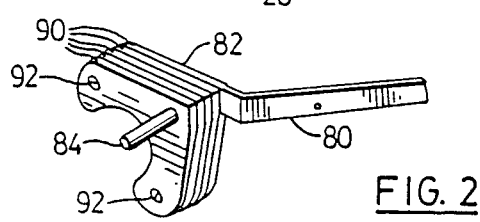
FIG. 2 is a detail of element 82 of FIG. 1.

The lever 80 extends outwardly across the conveyor support frame in a generally diagonal manner as shown in FIG. 1. The lever 80 is pivotally mounted by means of the pivot pin 84 and is balanced by the counterweight 82. The counterweight 82 may consist of a number of plates 90 secured together by means of screws 92 as shown in FIG. 2. In essence, the counterweight 82 is a means for urging the lever 80 into position. Such position may be referred to as a first rest position where, as shown in FIG. 3, the lever 80 is closely spaced beneath the upper flight 64 of the conveyor 12.

The counterweight 82 is designed to rest on a stop means. In the preferred embodiment, the stop means is the axle 54. The axle 54 may be provided with a cover, (not shown) to prevent the counterweight from scoring the axle 54. Alternatively, a stop means may be used which extends inwardly from the side 28 of the support frame 20. As is apparent, the first rest position of the lever 80 will be determined by the location of the counterweight 82 in relation to the axle 54 or other stop means used.

It will be appreciated by those skilled in the art that the counterweight 82 is only one of many different types of mechanisms that could be used to urge the lever 80 into such first rest position. For example, a spring could also be used. However, the important function of the counterweight 82, or any equivalent means for urging the lever 80, is that the lever 80 not be too easily deflectable from its rest position; it must be stable enough so that it responds only to a significant predetermined amount of build up of slack in the upper flight 64 of chain 62, and not, for example, the slack that may arise initially and briefly when material is first sent down inlet chute 24, causing a sudden loading on the chain 62. It is undesirable to have lever 80 too sensitive, which could cause unnecessary problems in operating the conveyor 12.

The pivot pin 84 is rotationally secured in the support 20, through an upstanding side 28. Although the lever 80 is pivotally mounted, it is rotationally fixed to the pivot pin 84; upon deflection of the lever 80, pivot pin 84 rotates. To ensure that smooth rotation of the pivot pin 84 occurs, it has been found desirable to form an outwardly extending tongue 85, which provides additional guiding and support for the pivot pin 84.

The control switch actuatoro 86 may take the form of a trip lever 94 which is rotationally fixed to the pivot pin 84. The control switch 88 is secured to the support frame 20 in such a manner as to be adjacent to the trip lever 94. The control switch 88 is preferrably of the type that has an activating plunger 96 which comes into contact with the trip lever 94. The plunger 96 is urged towards trip lever 94 and when fully extended trips the control switch 88 which in turn shuts off the drive motor 22. While reference is made in the preferred embodiment to a plunger type of limit switch 88, it will be appreciated by those skilled in the art that many other types of contact micro switches could be substituted therefor.

It can now be appreciated how the drive motor controlling device 10 operates. Excessive slack in the chain 62 causes the upper flight 64 to sag, as shown in ghost outline at 98 in FIG. 3 which in turn will deflect the slack sensing lever 80 from its initial rest position, against the urging of counterweight 82. Deflection of the slack sensing lever 80, causes the pivot pin 84 to rotate, which in turn causes the trip lever 94 to rotate away from the control switch 88 as indicated by double headed arrow 95 shown in FIG. 1. As the trip lever 94 is moved away from the control switch 88, activating plunger 96 extends, until, when fully extended, control switch 88 is tripped, shutting off the drive motor 22. The control switch 88 can be inittially positioned in relation to the trip lever 94 so that any specific predetermined amount of deflection of lever 80, and hence trip lever 94, causes the motor 22 to be deactivated.

Excessive slack in the chain 62 may arise in a number of circumstances. For example, in the case of a break in the chain, the upper flight 64 will sag. Specifically, if the break is in the upper flight, then the chain might tend to roll backwards over the rollers 40, deflecting the lever 80. Further, if the break is in the lower flight 66 or the upper flight 64, the continued rotation of the drive sprocket will cause the chain 62 to accumulate on the upstream side of the drive sprocket 18, again causing the lever 80 to deflect. Even if the chain 62 is jammed, but not yet broken, somewhere along the upper flight 64, slack will build up on the upstream side of the drive sprocket 18 causing a deflection of the lever 80 and a deactivation of the motor 22.

Also shown in FIGS. 1 and 3, is a foreign object sensing flap 100. The foreign object sensing flap 100 is composed of a number of downwardly extending rigid strips 102 attached to a cross strip 104. The cross strip 104 in turn is secured to a hinge rod 106 which is rotationally housed in support frame 20. The foreign object sensing flap 100 is used to detect articles which may be caught on the endless material transporting member 14 whic may interfere with the free running of the scraper blades 60 or the chain 62. An example of an object which has not fallen through the outlet chute 26 is shown as 108 in FIG. 3. The object 108 will come into contact with foreign object sensing flap 100 and will cause it to rotate about hinge rod 106 displacing flap 100 as shown in ghost outlines.

A linking means is provided between the foreign object flap and the control switch 88 to prevent an object such as 108 from damaging the conveyor 12 for example by coming between the chain 62 and the drive sprocket 18. The linking means comprises a first linking element 110 which is rotationally fixed to the hinge rod 106. A second linking element 112, is this case a spring, connects thte first linking element 110 to the slack sensing lever 80 which in turn is connected to the control switch 88 in the manner described above.

It will now be appreciated that deflection of foreign object flap 100 in the direction of arrow 114 will cause a deflection of the first linking element 110 in the direcititon of arrow 116 which in turn will cause a deflection of slack sensing lever 80 in the direction of arrow 118. This in turn will cause the actuation of the control switch 88, shutting off the drive motor 22 in the manner previously described.

In a further aspect of the present invention, there is disclosed a structure for slideably housing the idler sprocket 16 in the support frame 20. As shown in FIG. 3, the idler sprocket 16 may be carried by a pair of moveable bearing plates 120. The moveable bearing plates would be located on either side of othe support frame 20 and would be slideable within an upper guide element 122 and a lower guide element 124. The bearing plates 120 would have bearings 126 which would retain the axle 128 to which the idler sprocket 16 is secured. A channel member 130 having a pair of legs 132, one on either side of support frame 20 would be attached to the moveable bearing plates 120. A spring 136 is housed between the channel member 130 and the end wall 34 of the support frame. The legs 132 have threaded ends 134. By turning the nuts 135 the tension in the endless material transporting member 14 can be adjusted to a desired predetermined amount.

It will now be appreciated that in the case of a jam in the conveyor in the upper flight, the drive sprocket will continue to drive the endless material transporting member 14 causing the idler sprocket 16 to move towards the drive sprocket 18 compressing the spring 136. This will allow slack to build up in the upper flight 64, tripping the slack sensing lever 80 and in turn, as previously described, stopping drive motor 22. In this manner, a chain break can be avoided.

It will be appreciated that the preceding description relates to a particular preferred embodiment of the invention and that many modifications are possible within the broad scope of the invention. Some of those modifications have been indicated above and others will be apparent to a person skilled in the art. For example, while the invention has been described in reference to a foreign object sensing flap 100 having downwardly extending rigid strips 102, there is no limitation to this particular configuration. For example, the flap could be solid, or even in the form of a single trip bar located above the lower flight 66 of the chain 62.

I claim:

1. A drive motor controlling device for a material transporting conveyor, the conveyor having an endless material transporting member running between an idler sprocket at one end and a drive sprocket at the other end, a support frame for supporting said sprockets and a drive motor for driving said drive sprocket, the drive motor controlling device comprising:
   a pivotally mounted slack sensing lever having a first rest position spaced part beneath an upper flight of said endless material transporting member,
   a means for urging said slack sensing lever into said first rest position,
   a means for sensing displacement of said slack sensing lever from said first rest position,
   a control switch actuated by said displacement sensing means for stopping said motor upon a redetermined amount of displacement of said slack sensing lever from said first rest position, and
   a pivotally mounted foreign object sensing flap having a second rest position spaced apart above a lower flight of said endless material transporting member, and a means for linking said foreign object sensing flap to said displacement sensing means for actuation of said control switch upon a predetermined amount of displacement of said foreign object sensing flap from said second rest position.

2. The drive motor controlling device of claim 1 wherein said slack sensing lever is mounted on a pivot pin, and said displacement sensing means comprises a control switch actuator fixed to said pivot pin, said actuator actuating said control switch and stopping said motor upon said predetermined amount of displaclement of said slack sensing lever, and thereby said acutator, from said first rest position.

3. The drive motor controlling device of claim 1, further including a hinge rod pivotally carried by said frame, said foreign object flap supported from said hinge rod, in a generally vertical manner and being generally spaced across and above the width of said lower flight of said endless material transporting member.

4. The drive motor controlling device of claim 1 wherein said linking means comprises a first linking element rotationally fixed to said foreign object flap, and a second linking element linking said first linking element to said slack sensing lever.

5. The drive motor controlling device of claim 1 further including a hinge rod pivotally carried by said frame, said foreign object flap being supported from said hinge rod, in a generally vertical manner, and wherein said linking means comprises a first linking element, rotationally fixed to said foreign object flap and a second linking element linking said first linking element to said slack sensing lever and wherein said slack sensing lever is mounted on a pivot pin, and said displacement sensing means comprises a control switch actuator rotationally fixed relative to said slack sensing lever, said actuator actuating said control switch and stopping said motor upon said predetermined amount of displacement of said foreign object flap, and thereby said slack sensing lever.

6. The drive motor controlling device of claim 5 wherein said second linking element is a spring.

7. The drive motor controlling device of claim 1 or 5 wherein said urging means comprises a counterweight, and a stop means, the counterweight resting against the stop means and maintaining the slack sensing lever in said first rest position.

8. A drive motor controlling device for a material transporting conveyor, the conveyor having an endless material transporting member running between an idler sprocket at one end, and a drive sprocket at the other end, a support frame for supporting said sprockets, and a drive motor for driving said drive sprocket, the drive motor controlling device comprising:
   a pivotally mounted slack sensing lever having a first rest position closely spaced apart beneath an upper flight of said endless material transporting member;
   a means for urging said slack sensing lever into said first rest position;
   a means for sensing displacement of said slack sensing lever from said first rest position;
   a control switch actuated by said displacement sensing means for stopping said motor upon a predetermined amount of displacement of said slack sensing lever from said first rest position; and
   a pivotally mounted foreign object sensing flap having a second rest position spaced apart above a lower flight of said endless material transporting member, and a means for linking said foreign object sensing flap to said displacement sensing means for actuation of said control switch upon a predetermined amount of displacement of said foreign object sensing flap from said second rest position;
and wherein said idler sprocket is slideably housed within said support frame, and is permitted a limited amount of movement, said idler sprocket being biased in a direction to maintain a predetermined amount of tension in said endless material transporting member, and upon said predetermined amount of tension being exceeded, said idler sprocket moving towards said drive sprocket, causing a downward deflection of said upper flight of said material transporting member onto said slack sensing lever, causing pivotal displacement of said slack sensing lever from said first rest position.

9. The drive motor controlling device of claim 8 wherein said limited amount of movement of said idler sprocket is sufficient to allow said downward deflection of said upper flight of said material transporting member to pivotally displace said slack sensing lever said predetermined amount for actuation of said control switch for stopping said motor.

* * * * *